Dec. 10, 1968     D. BARNES     3,415,707
SHEET LAY-UP APPARATUS
Filed Oct. 23, 1965     4 Sheets-Sheet 1
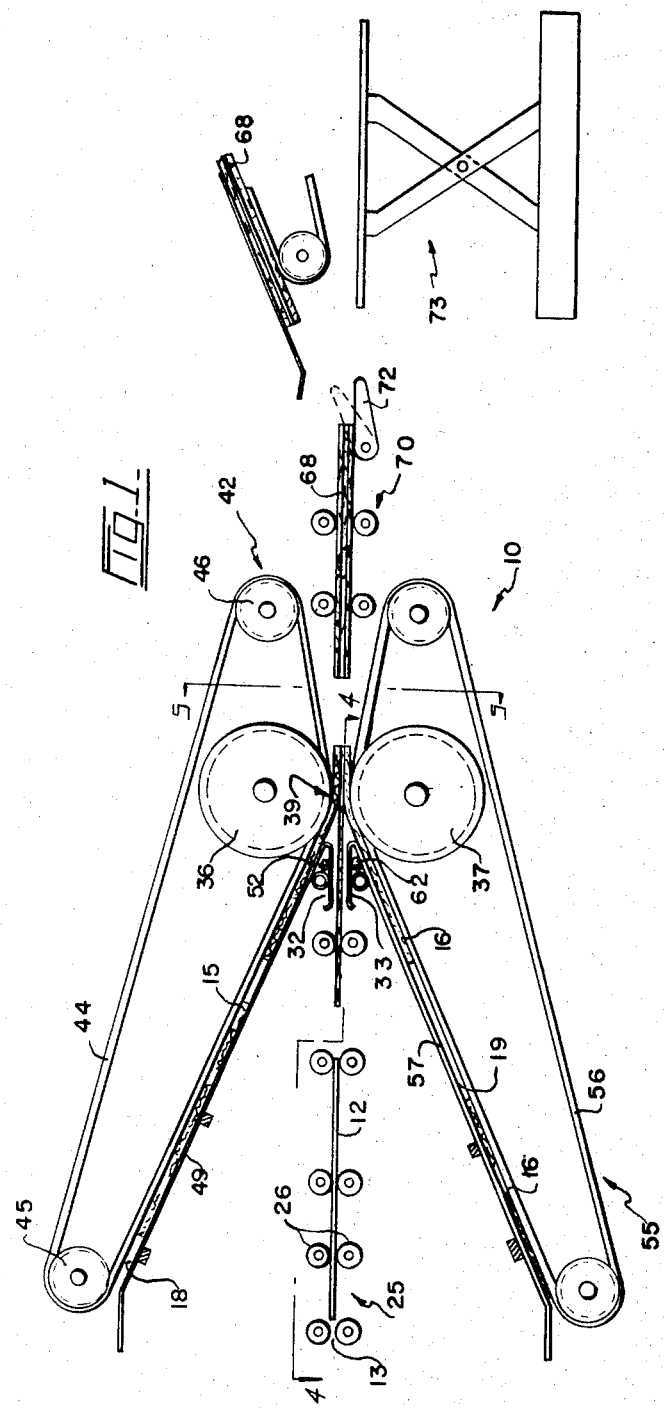
INVENTOR
DEREK BARNES
BY
Fetherstonhaugh & Co.
ATTORNEYS

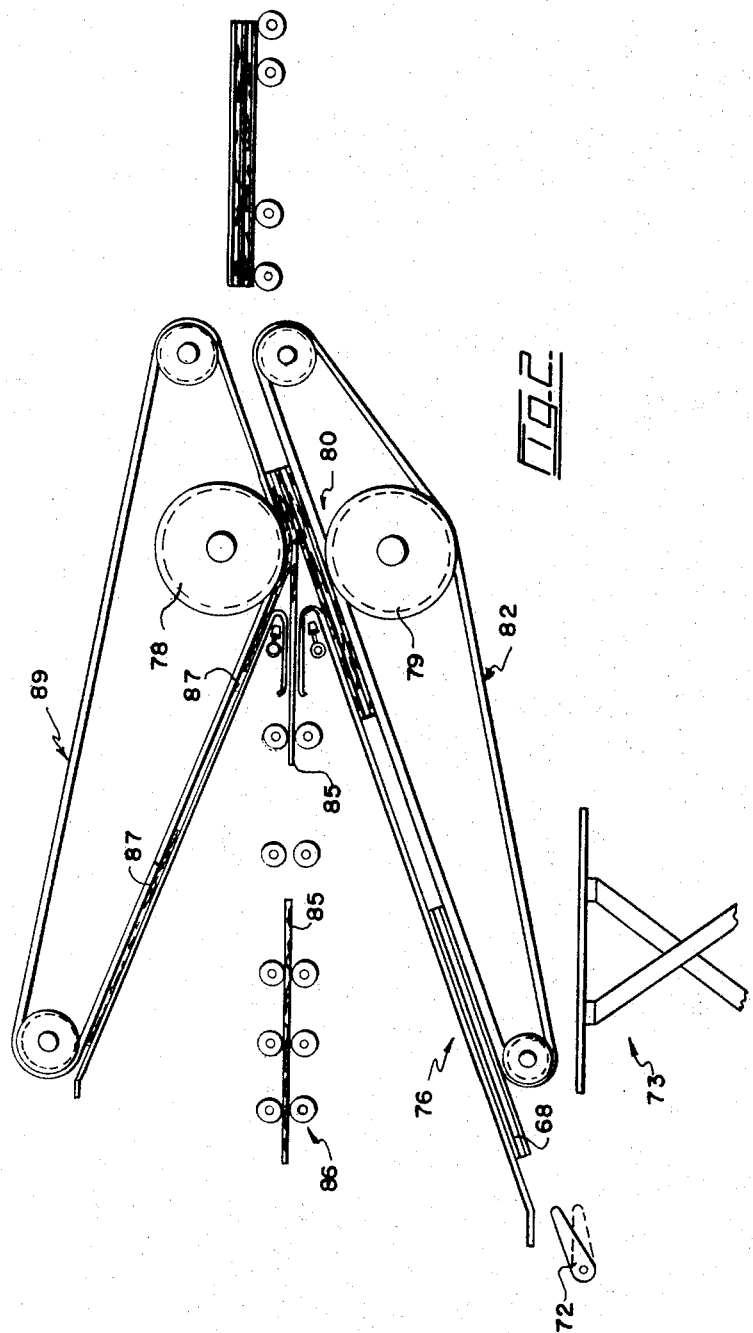

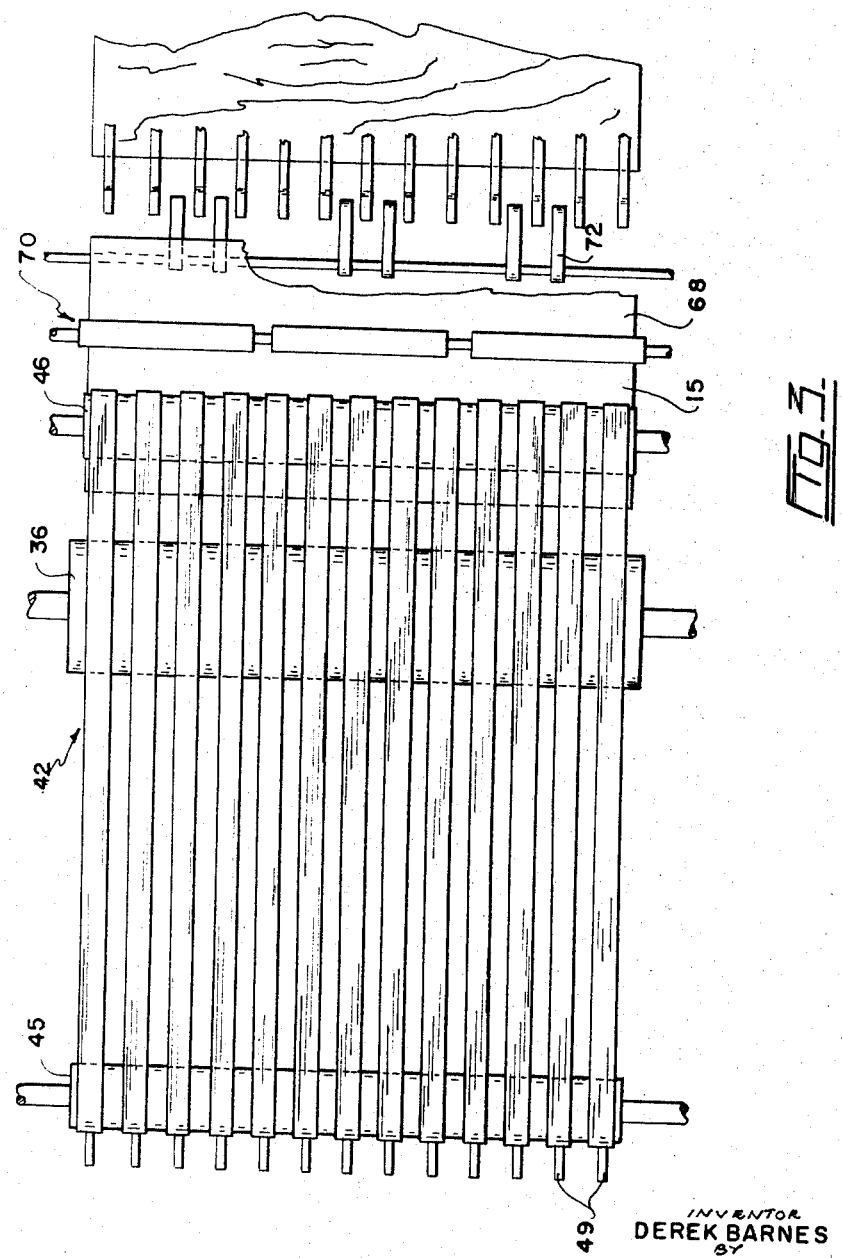

Dec. 10, 1968  D. BARNES  3,415,707
SHEET LAY-UP APPARATUS
Filed Oct. 23, 1965  4 Sheets-Sheet 4
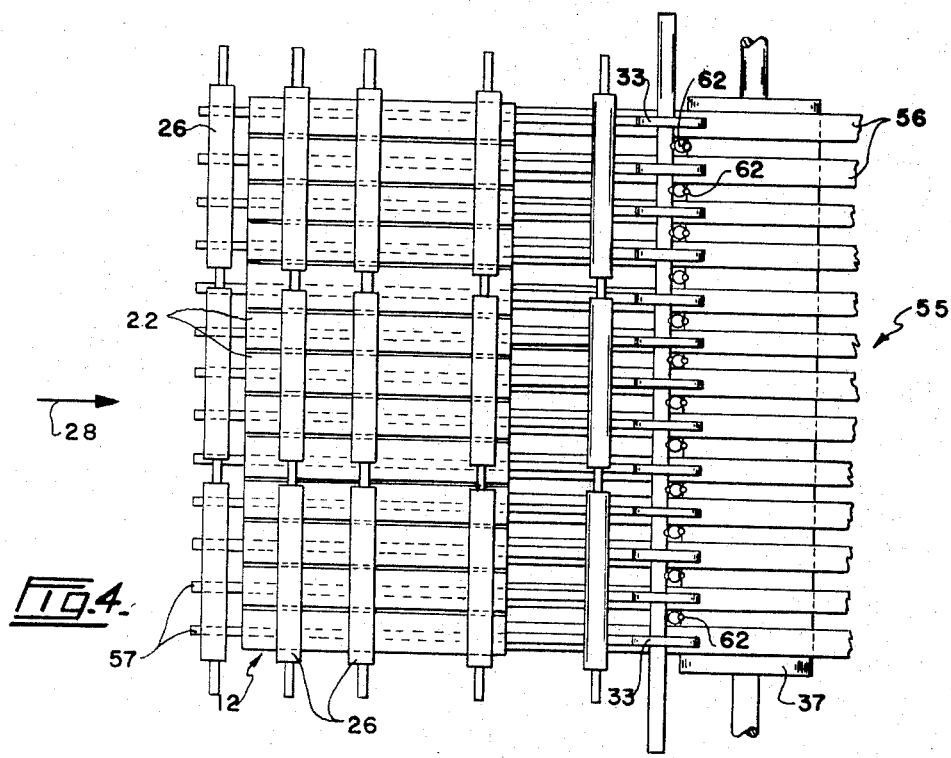
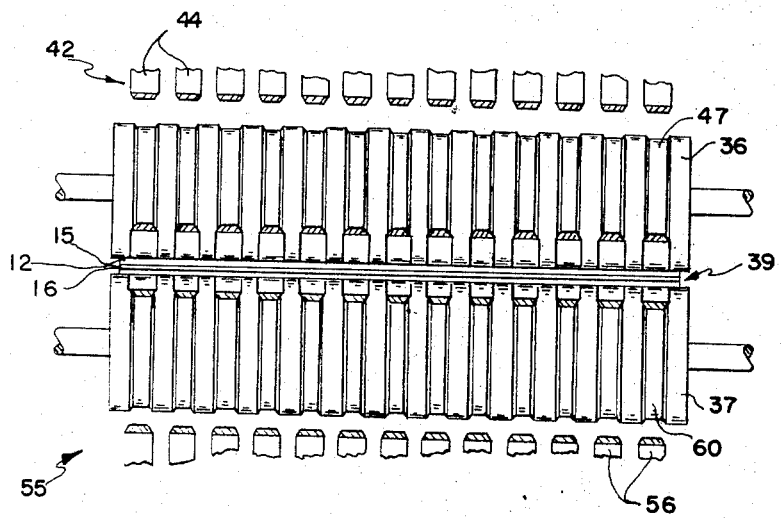
INVENTOR
DEREK BARNES
BY
Fetherstonhaugh & Co.
ATTORNEYS

United States Patent Office 3,415,707
Patented Dec. 10, 1968

3,415,707
SHEET LAY-UP APPARATUS
Derek Barnes, Vancouver Island, British Columbia, Canada, assignor to MacMillan, Bloedel and Powell River Limited, Vancouver, British Columbia, Canada
Filed Oct. 23, 1965, Ser. No. 503,078
14 Claims. (Cl. 156—557)

ABSTRACT OF THE DISCLOSURE

Apparatus for laying up and gluing a plurality of sheets to form laminated panels including conveying means for convergingly moving at least three vertically spaced streams of individual sheets into the pressure nip of upper and lower pressure means, and spray means for directing glue into the nip and on to the converging opposing surfaces of the sheets as said sheets move between the pressure means to be pressed together.

---

This invention relates to apparatus for continuously laying up and gluing a plurality of sheets of material to form laminated panels.

Although this apparatus may be used for laying up sheets of any type of material, it is particularly designed for laying up wood sheets or veneers during the manufacture of plywood, and it will be so described herein.

In most plants manufacturing plywood today, the face or outer sheets, centre sheets and core sheets are laid up by hand. For example, one way of doing this is to lay a back layer or veneer on a table, place a core or cross banding layer, in a single piece or multiple pieces, with glue applied to opposite faces thereof on top of the back layer, and then place the face layer or veneer thereon. If a panel of more than three plies is to be made, a centre veneer or layer is laid on the first cross banding layer, and then a second cross banding or core layer with glue applied thereto is laid on the centre veneer, followed by a face veneer on the second cross banding layer. The laid-up layers or sheets are placed in a hot press in order to complete the formation of a plywood panel. The hand assembly of the laminates is relatively slow and a waste of manpower. Some attempts have been made mechanically to lay up plywood laminates in batches. These are a little better than hand operations, but are still very slow, and this phase in the manufacture of plywood is very far behind the other phases which are done continuously and mechanically at relatively high speeds.

The present invention has the advantage over prior operations and apparatus in that the plywood laminates are continuously laid up so that the operation can form part of a continuous production line starting with the lathe that cuts the veneers from logs and ending with the assembled plies for the plywood panels.

Another advantage of the present apparatus is that it can be set up to make three-ply, five-ply or any other number of plies panels without an alteration. Furthermore, the apparatus can turn out panels of more than three plies at substantially the same rate of production as for three-ply panels.

An example of this invention is illustrated in the drawings, in which,

FIGURE 1 is a side elevation of apparatus for making three-ply panels or units,

FIGURE 2 is a side elevation of apparatus for receiving units from the apparatus of FIGURE 1 and making five-ply panels or units, FIGURE 3 is a plan view of the apparatus of FIGURE 1, FIGURE 4 is a horizontal section taken on the line 4—4 of FIGURE 1, and FIGURE 5 is a vertical cross section taken on the line 5—5 of FIGURE 1.

Referring to the drawings, 10 is a basic unit for the continuous lay-up apparatus according to the present invention. In general terms, a stream of core or cross banding sheets 12 are moved along a course 13, and stream of outer veneers or sheets 15 and 16 are moved respectively along courses 18 and 19 and applied to opposite faces of core sheets 12 as they move along course 13.

Core sheets 12 may be single sheets, or as is customary, each sheet may be made up of a plurality of strips 22 which are placed side by side and trimmed to the desired panel size, see FIGURE 4. In this example, each core sheet is made up in the usual manner of strips 22 and is fed in any desired manner into a conveyor 25 of any suitable type, such as a plurality of pairs of driven upper and lower pressure rollers 26 which extend across course 13 and are spaced from each other along the course distances less than half the width of a core sheet 12. It is preferable to move sheets 12 along course 13 in a direction extending transversely of the sheet, as indicated by arrow 28 in FIGURE 4. However, the apparatus can be made to move the sheets longitudinally thereof. Pressure rollers 26 of conveyor 25 are adapted to move core sheets consecutively between laterally spaced upper spring bars 32 and lower spring bars 33, and between power-driven upper and lower pressure rolls 36 and 37. These rolls are resiliently urged towards each other in any desired manner, not shown, such as by means of spring or pneumatic pressure means.

Upper course 18 is inclined towards course 13 at a shallow angle and merges with said course 13 at rolls 36 and 37. Face or upper sheets 15 are moved along course 18 on to the upper surfaces of core sheets 12 as the latter approach the nip 39 between rolls 36 and 37. In this example, a belt conveyor 42 is provided for this purpose. Conveyor 42 comprises a plurality of laterally spaced belts 44 extending around pulleys 45 and 46, each belt also extending through a groove 47 on roll 36 at nip 39. Each belt is formed of suitable material having a friction surface and/or has spaced lugs, not shown, projecting from the outer surface, said lugs arranged in pairs with the lugs of each pair spaced apart a distance equal to the width of a sheet 15. When the belt 44 passes through a groove 47 of roll 36, it does not project above the peripheral surface of said roll. If desired, shallow lugs may be provided on belt 44 properly to space sheets 15 thereon.

Belts 44 are positioned to move sheets 15 downwardly along laterally spaced bars 49 which are inclined towards and connected at their lower ends to bars 32.

Suitable means is provided for applying glue to the upper surface of each core sheet 12 as it approaches nip 39 of rolls 36 and 37. Standard equipment may be used for rolling glue on to said core sheets or, as preferred, glue is sprayed by a plurality of laterally spaced nozzles 52 which are positioned between bars 32 and 49 to direct glue through the spaces between the said bars into nip 39 where it is applied to the upper surface of each core sheet 12 and the lower surface of each upper sheet 15.

Lower sheets or veneers 16 are continuously directed into nip 39 beneath core sheets 12 in the same manner as sheets 15. A belt conveyor 55 made up of a plurality of belts 56 is adapted to move sheets 16 along a plurality of spaced bars 57 which are inclined towards and connected to spring bars 33. Belts 56 travel through grooves 60 in roll 37 at nip 39. A plurality of spray nozzles 62 are positioned between bars 33 and 57 to direct glue on to the lower surface of sheets 12 and the upper surface of sheets 16 as said sheets approach nip 39. If desired, glue can be applied to the lower surfaces of said core sheets by other means. Limit switches are provided along courses 13, 18 and 19 to operate the glue supply apparatus so that glue is directed out of nozzles 52 and 62 only when sheets 12, 15 and 16 are moving into and through nip 39 of pressure rolls 36 and 37.

The necessary sheets or laminates are directed into courses 13, 18 and 19 in any convenient manner, and they are timed so that a sheet 15 and a sheet 16 are always applied to the upper and lower surface of core sheet 12 as the latter moves into and through nip 39. Glue from nozzles 52 and 62 is sprayed on to the opposing faces of the three sheets, and rolls 36 and 37 press the sheets together to form three-ply panels or assemblies 68 which are taken away from the pressure rolls by a suitable conveyor 70.

If three-ply panels are required, they are directed by an off loader 72 on to a suitable conveyor or scissor lift 73.

If a five-ply panel is required, off loader 72 is operated to direct panels 68 to a second unit 76 which is the same as unit 10, see FIGURE 2. Unit 76 has driven pressure rolls 78 and 79 with a nip 80 therebetween. Panels or assemblies 68, which are equivalent of sheets for unit 76, are directed by a conveyor 82 into nip 80. At the same time, core or cross banding sheets 85 are directed by a conveyor 86 into said nip on top of panels 68. Upper or face sheets or veneers 87 are directed by a conveyor 89 on to the top of sheets 85 as the latter approach nip 80. Glue is applied to the opposite faces of core sheets 85, the upper face of panels 68 and the lower face of sheets 87 in the manner described above in connection with unit 10 as said sheets approach and move through nip 80 of pressure rolls 78. Thus, unit 76 applies core or cross banding sheets 85 and upper or face sheets 87 to panels 68, thereby producing five-ply panels.

It is obvious that if panels having seven or more plies are required, it is only necessary to provide additional units similar to unit 76 in order to produce them. As unit 10 is producing a three-ply panel at the same time as unit 76 is producing a five-ply panel, it will be seen that with this combination, as many five-ply panels can be produced in a given time by this apparatus as three-ply panels. This also applies to seven, nine and more ply panels.

If desired, conveyors 44 and 82 may be omitted from unit 10 and 76 so that the two units are required to produce three-ply panels. In this case, lower layers or sheets would be moved along course 19, and across banding or core sheets along course 13. Glue would be sprayed on to the upper surface of the sheets of course 19 and the lower surface of the sheets of course 13, and said sheets pressed together by rolls 36 and 37. The two-ply panels or assemblies thus formed would be directed to unit 76 where upper or face sheets would be applied by conveyor 89 to the upper surface thereof after glue had been sprayed on to the opposing surface thereof, said panels and sheets being pressed together by rolls 78 and 79.

What I claim as my invention is:

1. Apparatus for laying up and gluing a plurality of sheets to form laminated panels, comprising upper and lower co-acting pressure means having a pressure nip therebetween, conveyor means for convergingly moving at least three vertically spaced streams of individual sheets towards and into the nip between said upper and lower pressure means, and spray means for directing glue substantially in the direction of movement of the sheets and into the nip and on to converging opposing surfaces of the sheets just as said sheets move between the pressure means, whereby said opposing surfaces of the sheets of the streams are completely coated with glue immediately before being pressed and glued together by said pressure means.

2. Lay-up apparatus as claimed in claim 1 in which said pressure means comprises a plurality of sets of upper and lower co-acting pressure rolls spaced longitudinally of the conveyor means, and said spray means comprises a spray gun arrangement immediately ahead of each set of upper and lower pressure rolls.

3. Lay-up apparatus as claimed in claim 1 in which the pressure means comprises a set of upper and lower co-acting pressure rolls forming said nip therebetween, and said spray means comprises two spray gun arrangements one above and one below the intermediate sheet stream immediately ahead of said set of upper and lower pressure rolls.

4. Lay-up apparatus as claimed in claim 3 in which the conveying means comprises a main conveyor for moving said intermediate sheet streams into and through the nip of the pressure rolls, and upper and lower conveyors above and below the main conveyor and inclined towards the latter, said upper and lower conveyors being adapted to move upper and lower streams of sheets against upper and lower surfaces of the intermediate sheets as said intermediate sheets move into said nip between the rolls, said gun arrangements spraying glue on to the opposing surfaces of the sheets moving into said nip.

5. Apparatus for laying up and gluing a plurality of sheets to form laminated panels, comprising opposed co-acting pressure means having a pressure nip therebetween, conveying means for consecutively directing first sheets along a first course to the pressure nip, conveying means for consecutively directing along second and third courses inclined towards said first course second and third sheets to opposite faces of said first sheets as the latter approach the pressure nip, and means for applying glue to the opposed faces of the first, second and third sheets immediately before the first and third sheets are applied to the second sheet, said pressure means pressing the second and third sheets to the first sheets to form laminated panels.

6. Lay-up apparatus as claimed in claim 5 in which the glue applying means comprises spray nozzles positioned to spray glue in the general direction of movement of said sheets and on to said opposed faces of the first, second and third sheets as said sheets come together.

7. Apparatus for laying up and gluing a plurality of sheets to form laminated panels, comprising in combination a first unit comprising opposed co-acting pressure means having a pressure nip therebetween, conveying means for consecutively directing first sheets along a first course to the pressure nip, conveying means for consecutively directing along second and third courses inclined towards said first course second and third sheets to opposite faces of said first sheets as the latter approach the pressure nip, and means for applying glue to said opposite faces of the first sheets before the second and third sheets are applied thereto, said pressure means pressing the second and third sheets to the first sheets to form laminated panels; and a second unit substantially a duplicate of the first unit and including a fourth course having conveying means for moving fourth sheets to a second pressure nip of co-acting pressure means of the second unit, fifth and sixth courses inclined towards said fourth course on opposite sides thereof, said fifth course having conveying means for moving fifth sheets against said fourth sheets as the latter approach the second pressure nip, conveyor means for directing said panels to said sixth course to be moved by conveying means in said sixth course against said fourth sheets, and second means for applying glue to opposite faces of said fourth sheets before the fifth sheets and the panels are applied thereto.

8. Lay-up apparatus as claimed in claim 7 in which said second glue applying means comprises spray nozzles positioned to spray glue on to opposed faces of the fourth and fifth sheets, and opposed faces of the fourth sheets and the panels as said sheets and panels come together.

9. Apparatus for laying up and gluing a plurality of sheets to form laminated panels, comprising upper and lower pressure rolls having a pressure nip therebetween, first conveying means for consecutively directing first sheets along a first course to the pressure nip, laterally spaced upper and lower bars above and below said first course inclined respectively downwardly and upwardly towards and extending almost into said pressure nip and between which said first sheets are moved, second and third conveying means for consecutively pressing second and third sheets respectively against said upper and lower bars and moving said second and third sheets along the respective bars on to opposite faces of said first sheets as the latter reach the pressure nip, and spray means above and below said first course near the nip for directing glue on to opposed faces of the first, second and third sheets as said sheets come together.

10. Lay-up apparatus as claimed in claim 8 in which said spray nozzles are arranged to spray the glue in the general direction of movement of said sheets and said panels.

11. Lay-up apparatus as claimed in claim 9 in which each of said second and third conveying means comprises a plurality of laterally spaced belts extending around pulleys positioned to cause said belts to extend along the adjacent bars and through the pressure nip between said rolls.

12. Lay-up apparatus as claimed in claim 11 in which said upper and lower pressure rolls are formed with annular grooves therein through which the belts of the second and third conveying means extend.

13. Lay-up apparatus as claimed in claim 12 in which the annular grooves of each pressure roll are deep enough to accommodate the belts extending therebetween whereby said belts do not project outwardly beyond the surface of the roll.

14. Lay-up apparatus as claimed in claim 9 including a plurality of upper and lower spring bars above and below said first course near said pressure nip and connected respectively to said first-mentioned upper and lower bars, said spray means being arranged to spray the glue through spaces between said bars.

References Cited

UNITED STATES PATENTS

| 2,988,120 | 6/1961 | Forrest | 156—551 XR |
| 3,037,900 | 6/1962 | Hings et al. | 156—551 XR |

EARL M. BERGERT, *Primary Examiner.*

M. L. KATZ, *Assistant Examiner.*

U.S. Cl. X.R.

156—559; 144—281